United States Patent
Schmidt et al.

(10) Patent No.: US 11,632,650 B2
(45) Date of Patent: *Apr. 18, 2023

(54) COMMUNICATION BETWEEN AUTONOMOUS VEHICLES AND OPERATIONS PERSONNEL

(71) Applicant: GM Cruise Holdings LLC, San Francisco, CA (US)

(72) Inventors: Michael Frank Schmidt, Scottsdale, AZ (US); Sriram Salem Kannan, Pacifica, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/306,388

(22) Filed: May 3, 2021

(65) Prior Publication Data

US 2021/0258727 A1 Aug. 19, 2021

Related U.S. Application Data

(63) Continuation of application No. 16/905,430, filed on Jun. 18, 2020, now Pat. No. 11,026,049, which is a continuation of application No. 16/588,141, filed on Sep. 30, 2019, now Pat. No. 10,743,136.

(51) Int. Cl.
   *H04W 4/02* (2018.01)
   *H04W 4/40* (2018.01)

(52) U.S. Cl.
   CPC .......... *H04W 4/023* (2013.01); *H04W 4/026* (2013.01); *H04W 4/40* (2018.02)

(58) Field of Classification Search
   CPC ........ H04W 4/023; H04W 4/40; H04W 4/026
   USPC ...................................... 455/456.6
   See application file for complete search history.

(56) References Cited

U.S. PATENT DOCUMENTS

| 8,483,651 B1* | 7/2013 | Zamora ............... H04W 4/023 455/404.1 |
| 2013/0217421 A1* | 8/2013 | Kim ................... H04W 84/005 455/456.3 |
| 2017/0026794 A1* | 1/2017 | Baker ................. H04W 40/244 |
| 2018/0108242 A1* | 4/2018 | Wilkinson ............ G08B 31/00 |
| 2018/0196415 A1* | 7/2018 | Iagnemma et al. ........................ G01C 21/3438 |
| 2018/0341274 A1* | 11/2018 | Donnelly ........... G01C 21/3438 |

(Continued)

*Primary Examiner* — William Nealon
(74) *Attorney, Agent, or Firm* — Polsinelli PC

(57) ABSTRACT

A method for communication between autonomous vehicles and personnel can include receiving a signal from a remote computing system, the signal based upon a position of an autonomous vehicle and a first position of a mobile device, wherein the signal identifies that the mobile device is located in a path of the autonomous vehicle, responsive to receipt of the signal from the remote computing system, stopping the autonomous vehicle, receiving an updated signal from the remote computing system, the updated signal based upon a second position of the mobile device, the second position effective to facilitate a determination that the mobile device is no longer within the path of the autonomous vehicle, and responsive to receiving the updated position of the mobile device, resuming operation of the autonomous vehicle along the path. An autonomous vehicle and non-transitory computer-readable medium is also provided.

20 Claims, 5 Drawing Sheets

(56) References Cited

U.S. PATENT DOCUMENTS

2019/0268720 A1* 8/2019 Cantrell ............... H04W 4/029

* cited by examiner

COMMUNICATION BETWEEN AUTONOMOUS VEHICLES AND OPERATIONS PERSONNEL

CROSS-REFERENCE TO RELATED APPLICATIONS

This application is a continuation of U.S. application Ser. No. 16/905,430, filed on Jun. 18, 2020, entitled, "COMMUNICATION BETWEEN AUTONOMOUS VEHICLES AND OPERATIONS PERSONNEL", which is a continuation of U.S. patent application Ser. No. 16/588,141, filed on Sep. 30, 2019, entitled "COMMUNICATION BETWEEN AUTONOMOUS VEHICLES AND OPERATIONS PERSONNEL," all of which are hereby expressly incorporated herein by reference in their entireties.

TECHNICAL FIELD

The present technology relates to communicating between autonomous vehicles and personnel and more particularly to determining locations and paths of the autonomous vehicles and the personnel.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle is in an indoor facility, a location and path of the vehicle may be difficult to determine. Furthermore, in some facilities, there may be a high level of ambient noise and other distractions, which may affect personnel's attention and awareness. Similarly, in enclosed spaces and/or around corners, visibility and awareness of oncoming traffic are significantly reduced. Thus, the vehicle may become a hazard for personnel within the facility. Human drivers use their judgment and other senses to assess and determine when a path is safe to drive along and when a portion of the path is more difficult to navigate.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
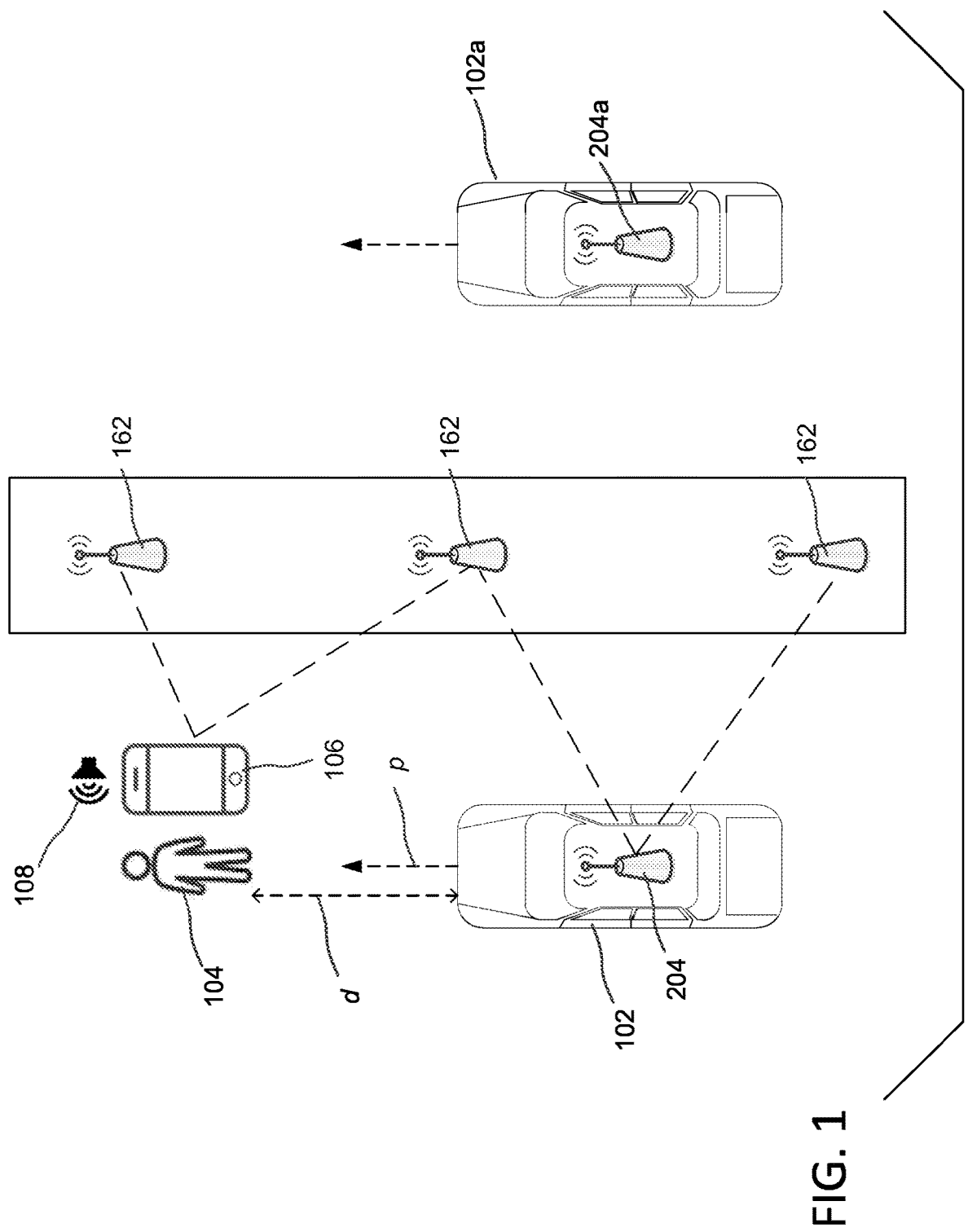
FIG. 1 shows an example environment having a personnel along a path of an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for an autonomous vehicle that can safely communicate with personnel indoors. While one solution is contemplated to have autonomous vehicles move slowly, this disclosure also considers that through communication between the autonomous vehicle and the personnel, the autonomous vehicle may move more efficiently while maintaining a high level of safety. Thus, this disclosure may result in a high throughput of traffic without sacrificing safety of the autonomous vehicles and the personnel.

In general, indoor facilities may be hazardous environments due to the high density of vehicles and personnel, enclosed spaces, sharp corners, etc. Because the autonomous vehicles lack a human driver to observe hazards and make decisions, the various factors that make indoor facilities into hazardous environments are exacerbated. In other words, it is challenging for the autonomous vehicle to safely and efficiently navigate hazardous indoor environments.

Moreover, it is also challenging to detect, with a high degree of fidelity and precision, the location of autonomous vehicles and personnel. More specifically, traditional global positioning services (GPS) may have weaker signal connections within walls. Thus, having highly accurate and precise locations of autonomous vehicles and personnel becomes significantly more difficult indoors.

Furthermore, there are challenges when the autonomous vehicle recognizes that personnel is in the way. For a human driver, the solution is simply to talk with the personnel. However, for an autonomous vehicle, the challenge is far more complex due to the reduced interaction and communication with the personnel.

The high frequency and consistency of notifications is yet another challenge for communicating between personnel and autonomous vehicles. When there is high frequency and consistency of notifications, personnel may quickly become desensitized to these notifications.

Accordingly, there is a need for a solution that will allow an autonomous vehicle to communicate with personnel, while also maintaining safety and efficiency in moving around the facility. Furthermore, there is a need for a solution that will allow for the autonomous vehicle to communicate with personnel without the personnel becoming desensitized to frequent and/or consistent communication.

FIG. 1 illustrates an example environment in which an autonomous vehicle 102 is in an indoor facility having personnel 104. The autonomous vehicle 102 may communicate with beacons 162 that communicate with the autonomous vehicle 102 and a mobile device 106 that the personnel 104 may carry.

The autonomous vehicle 102 travels along and has a path or trajectory p. When the autonomous vehicle 102 travels along the path p and personnel 104 crosses the path, the personnel 104 may be in danger. Similarly, if the personnel 104 is within a threshold distance d, then the personnel 104 may be in danger if the personnel 104 is unaware of the autonomous vehicle 102. As will be discussed in further detail below, the mobile device 106 may notify the personnel 104 with a notification 108 when the personnel 104 is within the threshold distance d and/or in the path p of the autonomous vehicle 102.

FIG. 1 further illustrates beacons 162 that are configured to communicate with and locate the autonomous vehicle 102 and the personnel 104. More specifically, the beacons 162 communicate with and locate the autonomous vehicle 102 and the mobile device 106 of the personnel 104. In some embodiments, the beacons 162 may be configured or arranged in specific locations so that multiple beacons 162 may simultaneously communicate with and locate the autonomous vehicle 102 and/or the mobile device 106 of the personnel. While distance between the beacon 162 and the autonomous vehicle 102 or the distance between the beacon 162 and the mobile device 106 may be simply determined by the communication between the respective parties, the specific position of the autonomous vehicle 102 and/or the mobile device 106 is a more complex task. By configuring or arranging the beacons in specific locations, multiple beacons 162 may simultaneously determine distances between the beacon 162 and the autonomous vehicle 102 and/or the mobile device 106. Thus, by using these different distances, the beacons 162 may determine the specific location of the autonomous vehicle 102 and/or the mobile device 106. In other words, the beacons 162 may triangulate the location of the autonomous vehicle 102 and the mobile device 106.

In some embodiments, the beacons 162 may be configured to emit, receive, and/or otherwise communicate signals in specific directions. For example, some beacons 162 may be directional antennae that only communicate electromagnetic waves in one general direction (e.g. West). As demonstrated in FIG. 1, the beacons 162 only communicate with the autonomous vehicle 102 and the mobile device 106, while another autonomous vehicle 102a is not in the general direction for beacons 162 to communicate with.

In some embodiments, the autonomous vehicle 102 may be configured to act as a beacon. More specifically, the autonomous vehicle 102 may have a sensor system 204 that is configured to communicate with other autonomous vehicles 102, mobile devices 106, and/or other beacons 162. Similarly, in some embodiments, the mobile device 106 is also configured to act as a beacon.

Although depicted as a mobile phone, the mobile device 106 may have a wide variety of different embodiments including, but not limited to, necklaces, watches, tablets, wristbands, etc. The mobile device 106 may be configured with an audio system to audibly output the notification 108.

In some embodiments, the mobile device 106 may have a vibration motor to provide the notification haptically. Thus, the notification 108 may be output to the personnel 104 in a wide variety of different methods including, but not limited to, audibly, haptically, visibly, etc.

Figure 2:
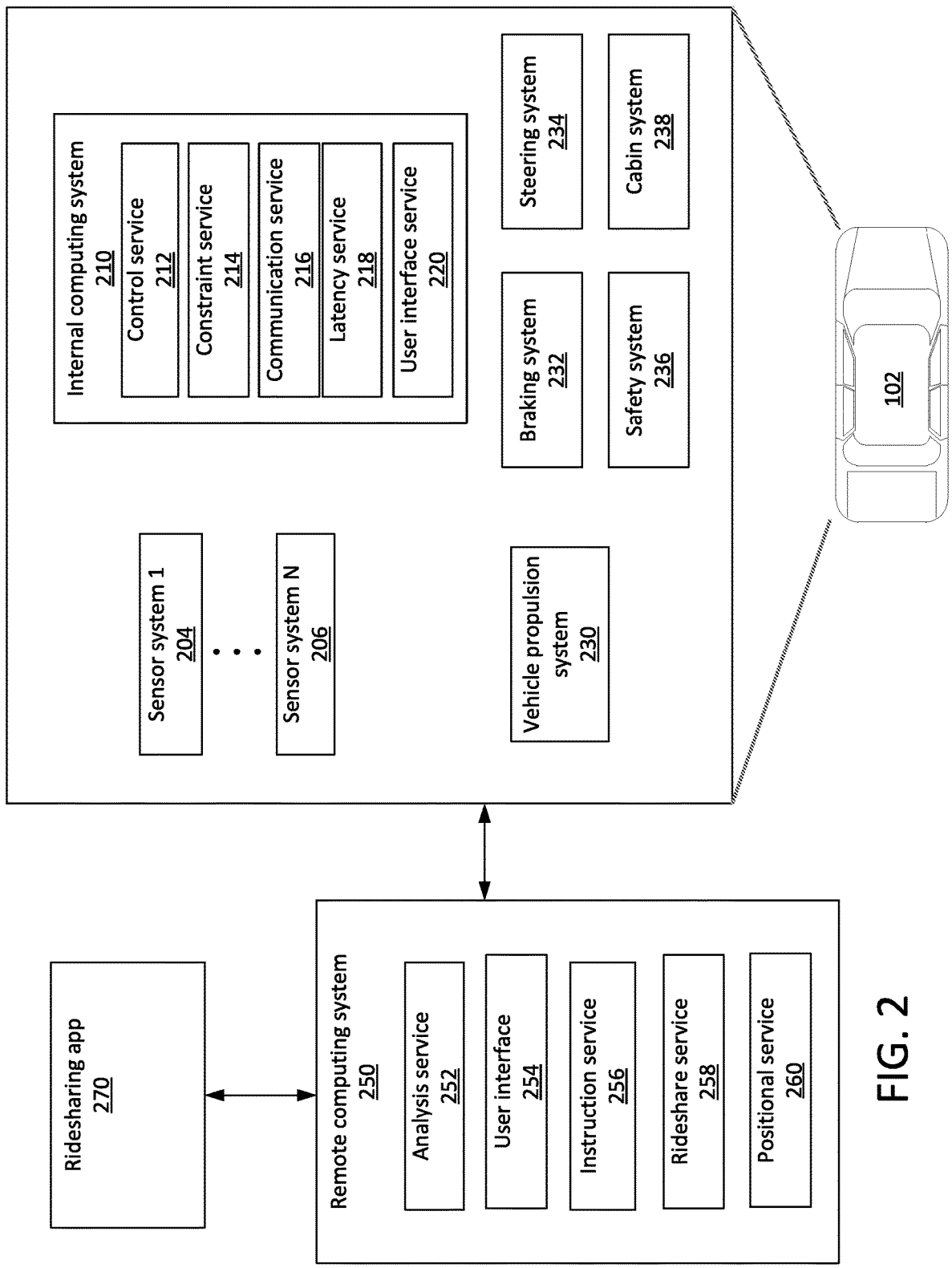
FIG. 2 shows an example of an example system for operating an autonomous vehicle in accordance with some aspects of the present technology.

FIG. 2 illustrates an environment that includes the autonomous vehicle 102 in communication with a remote computing system 250.

The autonomous vehicle 102 can navigate about roadways without a human driver based upon sensor signals output by sensor systems 204-206 of the autonomous vehicle 102. The autonomous vehicle 102 includes a plurality of sensor systems 204-206 (a first sensor system 204 through an Nth sensor system 206). The sensor systems 204-206 are of different types and are arranged about the autonomous vehicle 102. For example, the first sensor system 204 may be a camera sensor system, and the Nth sensor system 206 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 230, a braking system 232, and a steering system 234. The vehicle propulsion system 230 may include an electric motor, an internal combustion engine, or both. The braking system 232 can include an engine brake, brake pads, actuators, and/or any other suitable componentry that is configured to assist in decelerating the autonomous vehicle 102. The steering system 234 includes suitable componentry that is configured to control the direction of movement of the autonomous vehicle 102 during navigation.

The autonomous vehicle 102 further includes a safety system 236 that can include various lights and signal indicators, parking brake, airbags, etc. The autonomous vehicle 102 further includes a cabin system 238 that can include cabin temperature control systems, in-cabin entertainment systems, etc.

The autonomous vehicle 102 additionally comprises an internal computing system 210 that is in communication with the sensor systems 204-206 and the systems 230, 232, 234, 236, and 238. The internal computing system includes at least one processor and at least one memory having computer-executable instructions that are executed by the processor. The computer-executable instructions can make up one or more services responsible for controlling the autonomous vehicle 102, communicating with remote computing system 250, receiving inputs from passengers or human co-pilots, logging metrics regarding data collected by sensor systems 204-206 and human co-pilots, etc.

The internal computing system 210 can include a control service 212 that is configured to control the operation of the vehicle propulsion system 230, the braking system 232, the steering system 234, the safety system 236, and the cabin system 238. The control service 212 receives sensor signals from the sensor systems 204-206 as well communicates with other services of the internal computing system 210 to effectuate operation of the autonomous vehicle 102. In some embodiments, control service 212 may carry out operations in concert one or more other systems of autonomous vehicle 102.

The internal computing system 210 can also include a constraint service 214 to facilitate safe propulsion of the autonomous vehicle 102. The constraint service 216 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 212.

The internal computing system 210 can also include a communication service 216. The communication service can include both software and hardware elements for transmitting and receiving signals from/to the remote computing system 250. The communication service 216 is configured to transmit information wirelessly over a network, for example, through an antenna array that provides personal cellular (long-term evolution (LTE), 3G, 5G, etc.) communication.

In some embodiments, one or more services of the internal computing system 210 are configured to send and receive communications to remote computing system 250 for such reasons as reporting data for training and evaluating machine learning algorithms, requesting assistance from remoting computing system or a human operator via remote computing system 250, software service updates, ridesharing pickup and drop off instructions etc.

The internal computing system 210 can also include a latency service 218. The latency service 218 can utilize timestamps on communications to and from the remote computing system 250 to determine if a communication has been received from the remote computing system 250 in time to be useful. For example, when a service of the internal computing system 210 requests feedback from remote computing system 250 on a time-sensitive process, the latency service 218 can determine if a response was timely received from remote computing system 250 as information can quickly become too stale to be actionable. When the latency service 218 determines that a response has not been received within a threshold, the latency service 218 can enable other systems of autonomous vehicle 102 or a passenger to make necessary decisions or to provide the needed feedback.

The internal computing system 210 can also include a user interface service 220 that can communicate with cabin system 238 in order to provide information or receive information to a human co-pilot or human passenger. In some embodiments, a human co-pilot or human passenger may be required to evaluate and override a constraint from constraint service 214, or the human co-pilot or human passenger may wish to provide an instruction to the autonomous vehicle 102 regarding destinations, requested routes, or other requested operations.

As described above, the remote computing system 250 is configured to send/receive a signal from the autonomous vehicle 140 regarding reporting data for training and evaluating machine learning algorithms, requesting assistance from remote computing system 250 or a human operator via the remote computing system 250, software service updates, rideshare pickup and drop off instructions, etc.

The remote computing system 250 includes an analysis service 252 that is configured to receive data from autonomous vehicle 102 and analyze the data to train or evaluate machine learning algorithms for operating the autonomous vehicle 102. The analysis service 252 can also perform analysis pertaining to data associated with one or more errors or constraints reported by autonomous vehicle 102.

The remote computing system 250 can also include a user interface service 254 configured to present metrics, video, pictures, sounds reported from the autonomous vehicle 102 to an operator of remote computing system 250. User interface service 254 can further receive input instructions from an operator that can be sent to the autonomous vehicle 102.

The remote computing system 250 can also include an instruction service 256 for sending instructions regarding the operation of the autonomous vehicle 102. For example, in response to an output of the analysis service 252 or user interface service 254, instructions service 256 can prepare instructions to one or more services of the autonomous vehicle 102 or a co-pilot or passenger of the autonomous vehicle 102.

The remote computing system 250 can also include a rideshare service 258 configured to interact with ridesharing application 270 operating on (potential) passenger computing devices. The rideshare service 258 can receive requests to be picked up or dropped off from passenger ridesharing app 270 and can dispatch autonomous vehicle 102 for the trip. The rideshare service 258 can also act as an intermediary between the ridesharing app 270 and the autonomous vehicle wherein a passenger might provide instructions to the autonomous vehicle 102 to go around an obstacle, change routes, honk the horn, etc.

The remote computing system 250 can also include a positional service 260 configured to determine the position of the autonomous vehicle 102 and/or the position of the mobile device 106. The remote computing system 250 may communicate with beacons 162 to determine the position of the autonomous vehicle 102 and/or the mobile device 106. In some embodiments, the positional service is on the autonomous vehicle 102 and/or the mobile device 106.

Figure 3:
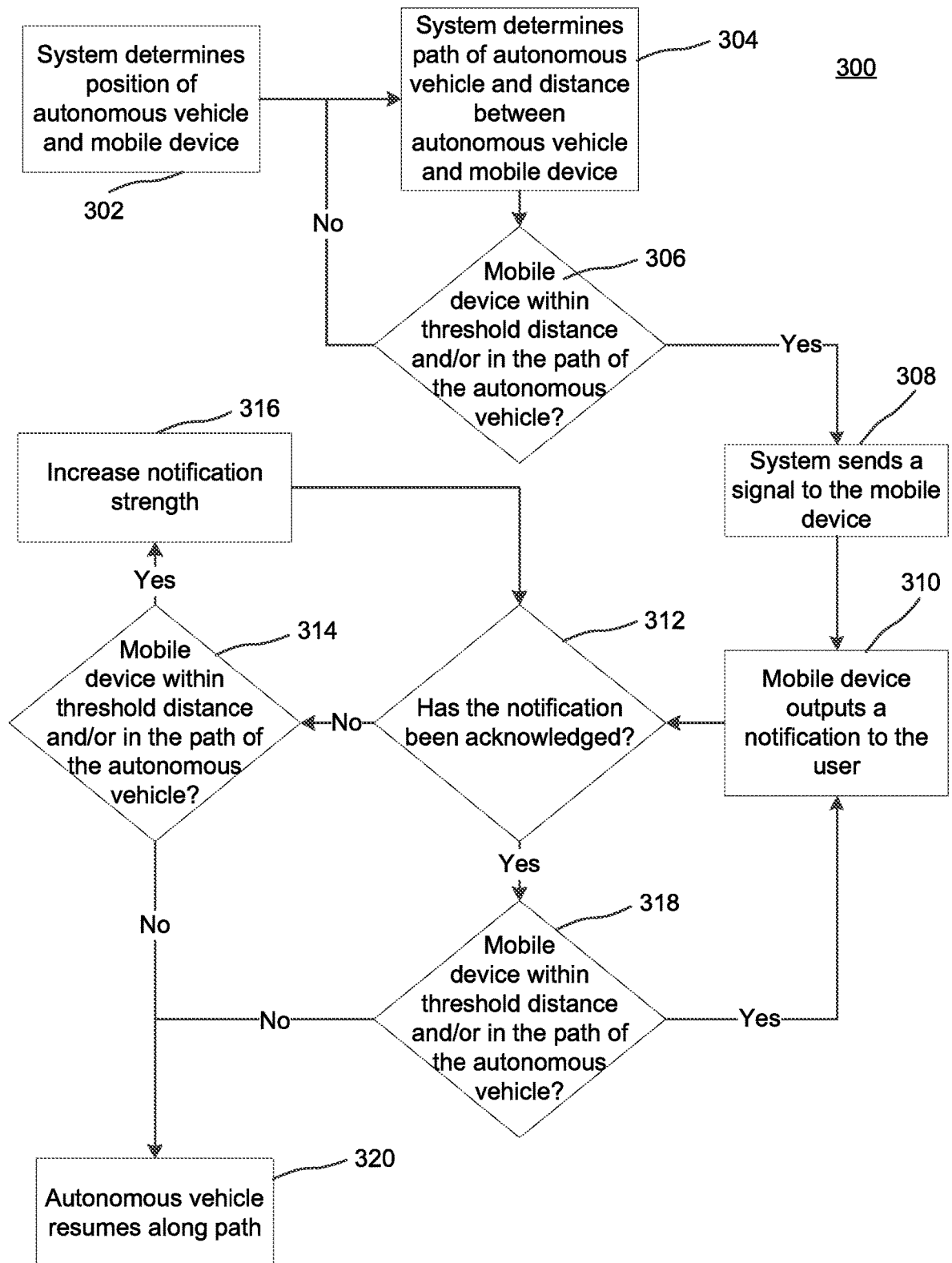
FIG. 3 is a flow diagram that illustrates a process for communicating between the autonomous vehicle and the personnel; in accordance with some aspects of the present technology

FIG. 3 illustrates a flow diagram for a navigation oversight process 300 that the autonomous vehicle 102 may perform in an indoor environment or situation.

The navigation oversight process 300 starts with the remote computing system 250 detecting 302 the position of the autonomous vehicle 102 and the position of the mobile device 106. In some embodiments, the navigation oversight process 300 starts with the remote computing system 250 detecting 302 that the position of the autonomous vehicle 102 and the mobile device 106 are in an indoor environment.

The remote computing system 250 then calculates 304 the path p of the autonomous vehicle 102 and the distance between the autonomous vehicle 102 and the personnel 104. More specifically, the distance may be calculated 304 between the position of the autonomous vehicle 102 and the position of the mobile device 106 of the personnel 104.

The remote computing system 250 then determines 306 if the mobile device 106 and/or the personnel 104 is in the path p of the autonomous vehicle 102. In some embodiments, the remote computing system 250 may determine 306 if the distance between the mobile device 106 and the autonomous vehicle 102 is shorter than the threshold distance d. In other words, the computing system 350 may also determine 306 if the mobile device 106 and/or the personnel 104 is within threshold distance d from the autonomous vehicle 102. If the computing system 350 determines 306 that the mobile device 106 and/or the personnel is not in the path p of the autonomous vehicle 102, then the remote computing system 250 returns to calculating 304 the path p of the autonomous vehicle 102 and the distance between the autonomous vehicle 102 and the personnel 104.

In some embodiments, the remote computing system 250 may determine both that the mobile device 106 is within the path p of the autonomous vehicle 102 and within threshold distance d from the autonomous vehicle. In these embodiments, at least four scenarios become possible: 1) the mobile device 106 is determined to be within the path p of the autonomous vehicle 102 and within threshold distance d from the autonomous vehicle 102; 2) the mobile device 106 is determined to be within the path p of the autonomous vehicle 102 and not within threshold distance d from the autonomous vehicle 102; 3) the mobile device 106 is determined to not be within the path p of the autonomous vehicle 102 but is within threshold distance d of the autonomous vehicle 102; and 4) the mobile device 106 is neither within the path p of the autonomous vehicle 102 nor within threshold distance d of the autonomous vehicle 102. In some embodiments, the remote computing system 250 may require only one the above factors to be true for the navigation oversight process 300 to continue to the next step. Thus, in these embodiments, situations 1-3 would all move to the next step, while situation 4 would result in the remote computing system 250 returning to calculating 304 the path p of the autonomous vehicle 102 and the distance between the autonomous vehicle 102 and the mobile device 106. In some embodiments, the remote computing system 250 may require both that the mobile device 106 is within the path p and within threshold distance d from the autonomous vehicle 102. Thus, in these embodiments, only situation 1 would move to the next step, while situations 1-3 would result in the remote computing system 250 returning to calculating the path p and the distance between the autonomous vehicle 102 and the mobile device 106.

In the next step, the remote computing system 250 has now determined 306 that the mobile device 106 is within the path p of the autonomous vehicle 102 and/or within threshold distance d from the autonomous vehicle 102. In response to determining 306 the above, the remote computing system sends 308 a signal to the mobile device 106. The signal may include information, such as the path p that the autonomous vehicle 102 is travelling along, that the mobile device 106 is now within the threshold distance d of the autonomous vehicle 102, a speed of the autonomous vehicle 102, an amount of time until the autonomous vehicle 102 must stop for the personnel 104, etc. In some embodiments, the location of the autonomous vehicle 102 may be transmitted to the mobile device 106 based on an intent of where the autonomous vehicle 102 plans to go (i.e. path p).

The remote computing system 250 then causes the mobile device 106 to output 310 the notification 108 so that the personnel 104 may be aware of the notification 108. The notification 108 may include similar information as the signal above. In other words, the notification 108 may inform the personnel 104 of a wide variety of information including, but not limited to, the path p, the position of the mobile device 106 being within the threshold distance d of the autonomous vehicle 102, the speed of the autonomous vehicle 102, etc. By sending the notification 108 to the mobile device 106 of the specific personnel 104 in that path p and/or within the threshold distance d from the autonomous vehicle 102, other personnel 104 are not exposed to the notification 108. Thus, the other personnel are not de-sensitized to the notifications as rapidly.

The remote computing system 250 then receives and/or verifies 312 acknowledgement of the notification 108. At this step, there are at least four possible situations that may arise: 1) the personnel 104 acknowledges the notification 108 and remains in the path p and/or within the threshold distance d the autonomous vehicle 102; 2) the personnel 104 does not acknowledge the notification 108 and remains in the path p and/or within the threshold distance d from the autonomous vehicle 102; 3) the personnel 104 acknowledges the notification 108 and moves out of the path p and/or away from the autonomous vehicle 102; and 4) the personnel 104 does not acknowledge the notification 108 but moves out of the path p and/or away from the autonomous vehicle 102 anyways. To handle the wide variety of different scenarios here, the remote computing system 250 may proceed as follows.

After a threshold period of time, if the remote computing system 250 has not received and/or verified 312 acknowledgement of the notification 108, then the remote computing system 250 determines 314 again whether the mobile device 106 is within the path p and/or within the threshold distance d from the autonomous vehicle 102 as discussed above.

If the remote computing system 250 determines 314 that the mobile device 106 is still within the path p and/or within the threshold distance d from the autonomous vehicle 102, then the remote computing system 250 increases 316 an intensity of the notification 108. As discussed above, the intensity may be based on frequency, vibration strength, sound strength, etc. For clarity, this is one embodiment to handle scenario 1 as detailed above. The remote computing system 250 then returns to receiving and/or verifying 312 acknowledgement of the notification 108. In some embodiments, the controls of the autonomous vehicle 102 may be modified based on action or inaction from the personnel 104. For example, the autonomous vehicle 102 may honk or flash lights to alert personnel 104.

If the remote computing system 250 receives and/or verifies 312 acknowledgement of the notification 108, the remote computing system 250 determines 318 again whether the mobile device 106 is within the path p and/or within the threshold distance d from the autonomous vehicle 102 as discussed above.

If the remote computing system 250 determines 318 that the mobile device 106 is still within the path p and/or within the threshold distance d from the autonomous vehicle 102, then the remote computing system 250 returns to causing the mobile device 106 to output the notification 108 again. The re-issuing of the notification 108 is used to combat the effects of de-sensitization and/or forgetfulness of the personnel 104. In other words, if the personnel 104 habitually acknowledges notifications 108 without enacting any other further action (e.g. moving out of the path p), then the personnel 104 will receive another notification 108, which will force the personnel 104 to check the mobile device 106 again. Furthermore, the notification 108 may include instructions to move out of the path p and/or away from the autonomous vehicle 102. Similarly, the notification 108 may provide more detailed instructions upon reissuance. For clarity, this is one embodiment to address scenario 2 as detailed above. In some embodiments, the controls of the autonomous vehicle 102 may be modified based on action or inaction from the personnel 104. For example, the autonomous vehicle 102 may honk or flash lights to alert personnel 104.

In the two remaining scenarios, the remote computing system 250 has either received and/or verified 312 acknowledgement of the notification 108 or has not received and/or verified 312 acknowledgement of the notification. Again, the remote computing system 250 determines 314, 318 whether the mobile device 106 is still within the path p and/or within the threshold distance d from the autonomous vehicle 102. For these two remaining scenarios, the remote computing system 250 determines 314, 318 that the mobile device 106 is no longer within the path p and/or within the threshold distance d from the autonomous vehicle 102. In other words, the personnel 104 is no longer in danger. Thus, the autonomous vehicle 102 resumes 320 along the path p. The lack of increasing 316 notification 108 strength and/or causing the mobile device 106 to output 310 again the notification 108 may further combat de-sensitization to notifications 108. Accordingly, when the personnel 104 is no longer in danger, the remote computing system 250 can remove the notification 108, so that the personnel 104 does not need to experience a high frequency and/or intensity of notifications 108.

Although discussed above as the remote computing system 250 implementing the navigation oversight process 300, it is understood that the above is merely focusing on the remote computing system 250 for explanatory purposes only. In other words, the autonomous vehicle 102 and the mobile device 106 may also be configured to implement the navigation oversight process 300.

Figure 4:
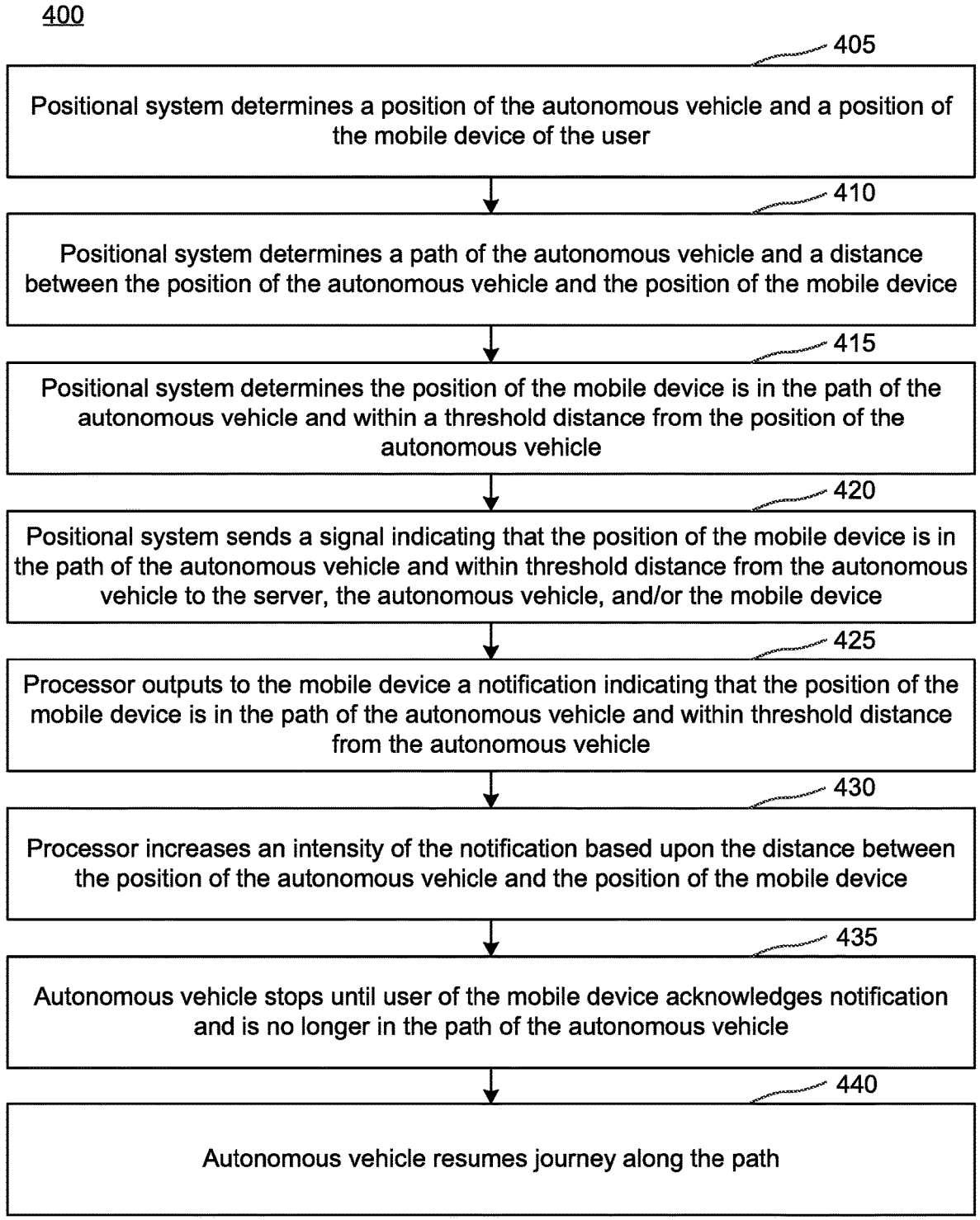
FIG. 4 illustrates an example sequence of steps for communicating between the autonomous vehicle and the personnel in accordance with some aspects of the present technology.

FIG. 4 illustrates an example sequence of steps for a communication process 400 that enables communication between the autonomous vehicle 102 and the mobile device 106.

The communication process 400 begins when a positional system or a positional service 260 detects 405 a position of the autonomous vehicle 102 and a position of the mobile device 106 of the personnel 104. In some embodiments, the communication process 400 begins when the positional service 260 detects the autonomous vehicle 102 and the mobile device 106 are indoors.

The positional system 260 then calculates 410 the path p of the autonomous vehicle 102 and/or the distance between the autonomous vehicle 102 and the mobile device 106.

Next, the positional system 260 determines 415 whether the mobile device 106 is in the path p of the autonomous vehicle 102 and/or within the threshold distance d from the autonomous vehicle 102. In some embodiments, the positional system 260 determines 415 whether the distance between the autonomous vehicle 102 and the mobile device 106 is shorter than the threshold distance d.

When the positional system 260 determines 415 that the mobile device 106 is in the path p of the autonomous vehicle 102 and/or within the threshold distance d from the autonomous vehicle 102, the positional system 260 sends 420 a signal to the mobile device 106 of the specific personnel 104 that is in the path p of the autonomous vehicle 102 and/or within the threshold distance d from the autonomous vehicle 102. The signal may indicate that the position of the mobile device is in the path p of the autonomous vehicle 102 and/or within the threshold distance d from the autonomous vehicle. The signal may be sent to the remote computing system 250, the mobile device 106 and/or the autonomous vehicle 102.

In some embodiments, the signal may cause a processor of the mobile device 106 to cause the mobile device 106 to output 425 the notification 108. Upon receipt of the signal, the mobile device 106 may output 425 the notification 108. More specifically, the processor of the mobile device 106 causes the mobile device 106 to output 425 the notification 108. As discussed above, the notification 108 may be output 425 in a variety of different methods including, but not limited to, haptically, audibly, visibly, etc. In some embodiments, the notification 108 may indicate that the position of the mobile device is in the path p of the autonomous vehicle 102 and/or the position of the within the threshold distance d from the autonomous vehicle 102.

The processor may increase 430 an intensity of the notification 108 based upon the distance between the position of the autonomous vehicle 102 and the position of the mobile device 106. In other words, as the autonomous vehicle 102 and the mobile device 106 get closer, the intensity of the notification may be stronger. For example, as the autonomous vehicle 102 approaches the mobile device 106 that is in path p, the notification 108 may vibrate more frequently or more strongly to inform the personnel 104 that the autonomous vehicle 102 is approaching. Similarly, the notification 108 may be configured to provide directional information. For example, an audible notification 108 may be configured with an audio system (e.g. headphones that provide stereo audio) to inform the personnel 104 audibly from a direction similar to a similar direction from which the autonomous vehicle 102 approaches. As another example, a necklace shaped mobile device 106 may vibrate along specific segments of the mobile device 106 to inform the personnel haptically from the direction that the autonomous vehicle 102 is approaching from. Similarly, the mobile device 106 may have carrying vibration pulses or ringtones to represent the autonomous vehicle 102 approaching from different areas of a facility. The autonomous vehicle 102 may also monitor decibels of facility noise and adjust its speed and the notification 108 to an appropriate level of decibels, frequency, and/or intensity.

When the autonomous vehicle 102 is within a critical distance from the mobile device 106, the autonomous vehicle 102 may stop 435 until the personnel 104 acknowledges the notification 108, is no longer in the path p of the autonomous vehicle 102, and/or within a threshold distance d from the autonomous vehicle 102.

After the personnel 104 acknowledges the notification 108, is no longer in the path p of the autonomous vehicle 102, and/or no longer within a threshold distance d from the autonomous vehicle 102, the autonomous vehicle 102 resumes 440 its journey along the path p.

Figure 5:
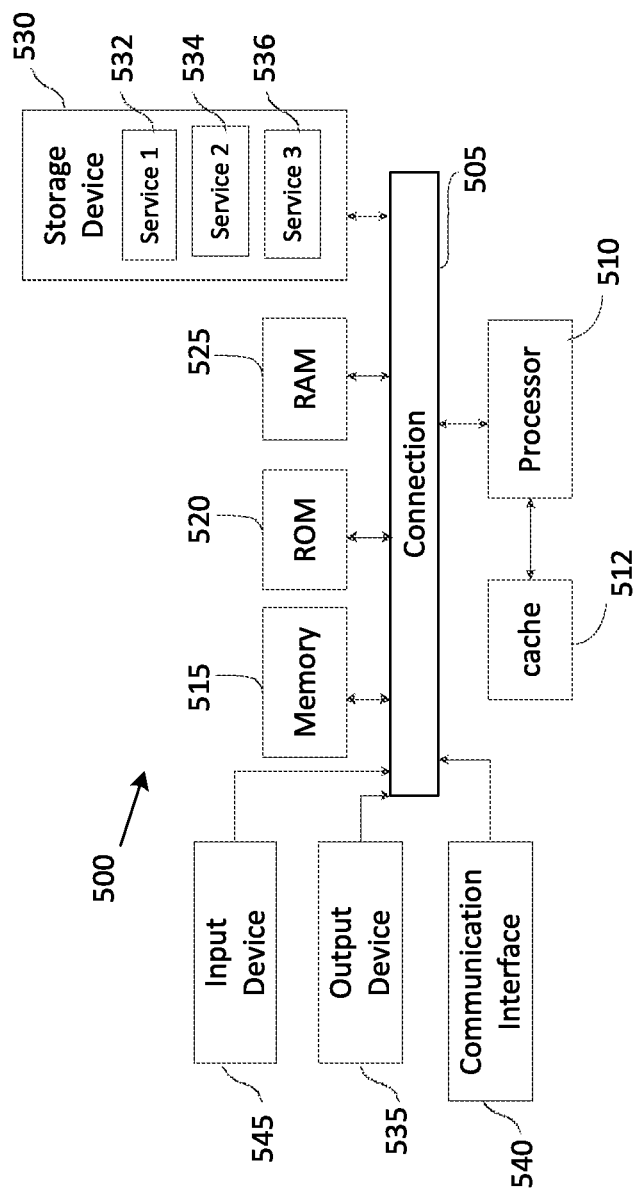
FIG. 5 shows an example of a system for implementing certain aspects of the present technology.

FIG. 5 shows an example of computing system 500, which can be for example any computing device making up internal computing system 110, remote computing system 150, (potential) passenger device executing rideshare app 270, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An autonomous vehicle, comprising:
 a computing system, wherein the computing system comprises:
  one or more processors;
  a transceiver coupled to the one or more processors; and
  a memory coupled to the one or more processors, wherein the memory stores computer-executable instructions that, when executed by the one or more processors, cause the one or more processors to:
   receive a signal from a remote computing system, the signal based upon a position of the autonomous vehicle and a first position of a mobile device, wherein the signal identifies that the mobile device is located in a path of the autonomous vehicle;
   responsive to receipt of the signal from the remote computing system, stop the autonomous vehicle;
   receive an updated signal from the remote computing system, the updated signal based upon a second position of the mobile device, the second position effective to facilitate a determination that the mobile device is no longer within the path of the autonomous vehicle; and responsive to receiving the updated position of the mobile device, resume operation of the autonomous vehicle along the path.

2. The autonomous vehicle of claim 1, wherein the computer-executable instructions, when executed by the processor, further cause the processor to perform operations comprising:
send a position signal of the autonomous vehicle to the remote computing system, wherein the position signal is configured to indicate the path of the autonomous vehicle.

3. The autonomous vehicle of claim 2, wherein sending the position signal of the autonomous vehicle includes communicating with beacons, wherein the beacons are in communication with the remote computing system.

4. The autonomous vehicle of claim 1, wherein the computer-executable instructions, when executed by the processor, further cause the processor to perform operations comprising:
emit a beacon signal, wherein the beacon signal is configured to facilitate locating a device.

5. The autonomous vehicle of claim 4, wherein the device is the mobile device.

6. The autonomous vehicle of claim 4, wherein the device is a second autonomous vehicle.

7. The autonomous vehicle of claim 1, wherein the computer-executable instructions, when executed by the processor, further cause the processor to perform operations comprising:
cause the autonomous vehicle to alert a user associated with the mobile device that the mobile device is in the path of the autonomous vehicle,
wherein alerting the user includes outputting a sound or flashing lights of the autonomous vehicle.

8. A method comprising:
receiving a signal from a remote computing system, the signal based upon a position of an autonomous vehicle and a first position of a mobile device, wherein the signal identifies that the mobile device is located in a path of the autonomous vehicle;
responsive to receipt of the signal from the remote computing system, stopping the autonomous vehicle;
receiving an updated signal from the remote computing system, the updated signal based upon a second position of the mobile device, the second position effective to facilitate a determination that the mobile device is no longer within the path of the autonomous vehicle; and
responsive to receiving the updated position of the mobile device, resuming operation of the autonomous vehicle along the path.

9. The method of claim 8, further comprising:
sending a position signal of the autonomous vehicle to the remote computing system, wherein the position signal is configured to indicate the path of the autonomous vehicle.

10. The method of claim 9, wherein sending the position signal of the autonomous vehicle includes communicating with beacons, wherein the beacons are in communication with the remote computing system.

11. The method of claim 8, further comprising:
emitting a beacon signal, wherein the beacon signal is configured to facilitate locating a device.

12. The method of claim 11, wherein the device is the mobile device.

13. The method of claim 11, wherein the device is a second autonomous vehicle.

14. The method of claim 8, further comprising:
causing the autonomous vehicle to alert a user associated with the mobile device that the mobile device is in the path of the autonomous vehicle,
wherein alerting the user includes outputting a sound or flashing lights of the autonomous vehicle.

15. A non-transitory computer-readable medium comprising instructions that, when executed by one or more processors, cause the one or more processors to:
receive a signal from a remote computing system, the signal based upon a position of an autonomous vehicle and a first position of a mobile device, wherein the signal identifies that the mobile device is located in a path of the autonomous vehicle;
responsive to receipt of the signal from the remote computing system, stop the autonomous vehicle;
receive an updated signal from the remote computing system, the updated signal based upon a second position of the mobile device, the second position effective to facilitate a determination that the mobile device is no longer within the path of the autonomous vehicle; and
responsive to receiving the updated position of the mobile device, resume operation of the autonomous vehicle along the path.

16. The non-transitory computer-readable medium of claim 15, wherein the instructions further cause the one or more processors to perform operations comprising:
send a position signal of the autonomous vehicle to the remote computing system, wherein the position signal is configured to indicate the path of the autonomous vehicle.

17. The non-transitory computer-readable medium of claim 16, wherein sending the position signal of the autonomous vehicle includes communicating with beacons, wherein the beacons are in communication with the remote computing system.

18. The non-transitory computer-readable medium of claim 15, wherein the instructions further cause the one or more processors to perform operations comprising:
emit a beacon signal, wherein the beacon signal is configured to facilitate locating a device.

19. The non-transitory computer-readable medium of claim 18, wherein the device is the mobile device.

20. The non-transitory computer-readable medium of claim 18, wherein the device is a second autonomous vehicle.

* * * * *